(12) United States Patent
Miyashita (10) Patent No.: US 11,714,545 B2
(45) Date of Patent: Aug. 1, 2023

(54) INFORMATION PROCESSING APPARATUS, INFORMATION PROCESSING METHOD, AND PROGRAM FOR CHANGING LAYOUT OF DISPLAY OBJECTS

(71) Applicant: SONY CORPORATION, Tokyo (JP)

(72) Inventor: Ken Miyashita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/449,739

(22) Filed: Jun. 24, 2019

(65) Prior Publication Data

US 2019/0310771 A1 Oct. 10, 2019

Related U.S. Application Data

(63) Continuation of application No. 15/185,963, filed on Jun. 17, 2016, now Pat. No. 10,379,736, which is a (Continued)

(30) Foreign Application Priority Data

Apr. 9, 2010 (JP) .................................. 2010-090289

(51) Int. Cl.
*G06F 3/0482* (2013.01)
*G06F 3/04886* (2022.01)
(Continued)

(52) U.S. Cl.
CPC ........ *G06F 3/04886* (2013.01); *G06F 3/0482* (2013.01); *G06F 3/0485* (2013.01);
(Continued)

(58) Field of Classification Search
CPC ............... G06F 3/04817; G06F 3/0482; G06F 3/04842; G06F 3/0486; G06F 3/04886; G06F 3/0485; G06F 3/044; G06T 13/80
See application file for complete search history.

(56) References Cited

U.S. PATENT DOCUMENTS 5,499,330 A 3/1996 Lucas et al.
5,757,371 A 5/1998 Oran et al.
(Continued)

FOREIGN PATENT DOCUMENTS

CN 101452366 A 6/2009
JP 2001-306375 A 11/2001
(Continued)

OTHER PUBLICATIONS

Que, "Microsoft Windows 7 Your Way: Speed Up and Customize Windows," Dec. 2009, ISBN 9780768696622 (Year: 2009).*
(Continued)

*Primary Examiner* — Alvin H Tan
(74) *Attorney, Agent, or Firm* — Paratus Law Group, PLLC (57) ABSTRACT

There is provided an information processing apparatus including a display section which displays, as a first layout state, an object group including a plurality of objects arranged in a first direction, a detection section which detects an operation input that is input to the display section, and a control section which, when the detection section detects an operation input in a second direction that is perpendicular to the first direction, changes the first layout state into a second layout state in which tire respective objects constituting the object group which has been selected are spread and pieces of information associated with the plurality of objects, respectively, are displayed.

21 Claims, 7 Drawing Sheets

Related U.S. Application Data continuation of application No. 13/076,063, filed on Mar. 30, 2011, now Pat. No. 9,383,898.

(51) Int. Cl.
  *G06F 3/04817* (2022.01)
  *G06F 3/0486* (2013.01)
  *G06F 3/0485* (2022.01)
  *G06T 13/80* (2011.01)
  *G06F 3/044* (2006.01)

(52) U.S. Cl.
  CPC ........ *G06F 3/0486* (2013.01); *G06F 3/04817* (2013.01); *G06T 13/80* (2013.01); *G06F 3/044* (2013.01)

(56) References Cited

U.S. PATENT DOCUMENTS

| | | | |
|---|---|---|---|
| 7,117,453 | B2 | 10/2006 | Drucker et al. |
| 7,325,196 | B1 | 1/2008 | Covington et al. |
| 7,386,806 | B2 | 6/2008 | Wroblewski |
| 7,634,733 | B2 | 12/2009 | Sadikali et al. |
| 8,276,093 | B2 | 9/2012 | Matsushima et al. |
| 8,375,302 | B2 | 2/2013 | Oakley et al. |
| 8,375,334 | B2 * | 2/2013 | Nakano ............... G06F 3/0481 715/848 |
| 8,587,528 | B2 | 11/2013 | Chaudhri |
| 9,513,765 | B2 | 12/2016 | Miyazaki et al. |
| 2003/0132959 | A1 | 7/2003 | Simister et al. |
| 2005/0021041 | A1 | 9/2005 | Ohwa et al. |
| 2007/0057951 | A1 | 3/2007 | Anthony et al. |
| 2007/0124677 | A1 | 5/2007 | de los Reyes et al. |
| 2007/0147178 | A1 | 6/2007 | Masuda et al. |
| 2007/0157089 | A1 | 7/2007 | Van Os et al. |
| 2008/0062141 | A1 | 3/2008 | Chandhri |
| 2008/0195973 | A1 | 8/2008 | Shimkin |
| 2009/0150775 | A1 | 6/2009 | Miyazaki et al. |
| 2009/0271723 | A1 | 10/2009 | Matsushima et al. |
| 2009/0313567 | A1 | 12/2009 | Kwon et al. |
| 2010/0023858 | A1 | 1/2010 | Ryu et al. |
| 2010/0070913 | A1 | 3/2010 | Murrett et al. |
| 2010/0083111 | A1 | 4/2010 | de los Reyes |
| 2010/0153844 | A1 | 6/2010 | Hwang et al. |
| 2011/0173530 | A1 | 7/2011 | Winternitz et al. |

FOREIGN PATENT DOCUMENTS

| | | |
|---|---|---|
| JP | 2007-179351 A | 7/2007 |
| JP | 2008-191895 A | 8/2008 |
| JP | 2009-157908 A | 7/2009 |
| JP | 2009-301579 A | 12/2009 |
| JP | 2010-503130 A | 1/2010 |
| JP | 2010-026710 A | 2/2010 |
| JP | 2010-055430 A | 3/2010 |

OTHER PUBLICATIONS

IClarified, "Official Windows 7 Press Release," Oct. 22, 2009, Available https://www.iclarified.com/5701/official-windows-7-press-release (Year: 2009).*
Windows 7 by Microsoft, "Arrange, sort, or group your files," Dec. 18, 2009, Available http://windows.microsoft.com/en-us/windows7/Arrange-sort-or-group-your-files.
Johnson et al., "Managing Files and Folders in Windows 7," Sep. 10, 2009, Available http://www.quepublishing.com/articles/article.aspx?p=1393064&seqNum=3.
Microsoft, "Windows lifecycle fact sheet," Last updated Jan. 2016, Available http://windows.microsoft.com/en-us/windows/lifecycle.
Brink, "Vista—Folder Window Icon Text—Hide or Show File Names," Feb. 1, 2010, Available https://web.archive.org/web/20100201172856/http://www.vistax64.com/tutorials/147339-folder-window-icon-text-hide-show-file-names.html.

* cited by examiner

INFORMATION PROCESSING APPARATUS, INFORMATION PROCESSING METHOD, AND PROGRAM FOR CHANGING LAYOUT OF DISPLAY OBJECTS

CROSS-REFERENCE TO PRIOR APPLICATION

This application is a continuation of U.S. patent application Ser. No. 15/185,963 (filed on Jun. 17, 2016), which is a continuation of U.S. patent application Ser. No. 13/076,063 (filed on Mar. 30, 2011 and issued as U.S. Pat. No. 9,383,898 on Jul. 5, 2016), which claims priority to Japanese Patent Application No. 2010-090289 (filed on Apr. 9, 2010), which are all hereby incorporated in their entirety.

BACKGROUND OF THE INVENTION

Field of the Invention

The present invention relates to an information processing apparatus, an information processing method, and a program, and more particularly to an information processing apparatus including a display section and a position detection sensor such as a touch panel, an information processing method, and a program.

Description of the Related Art

Figure 7:
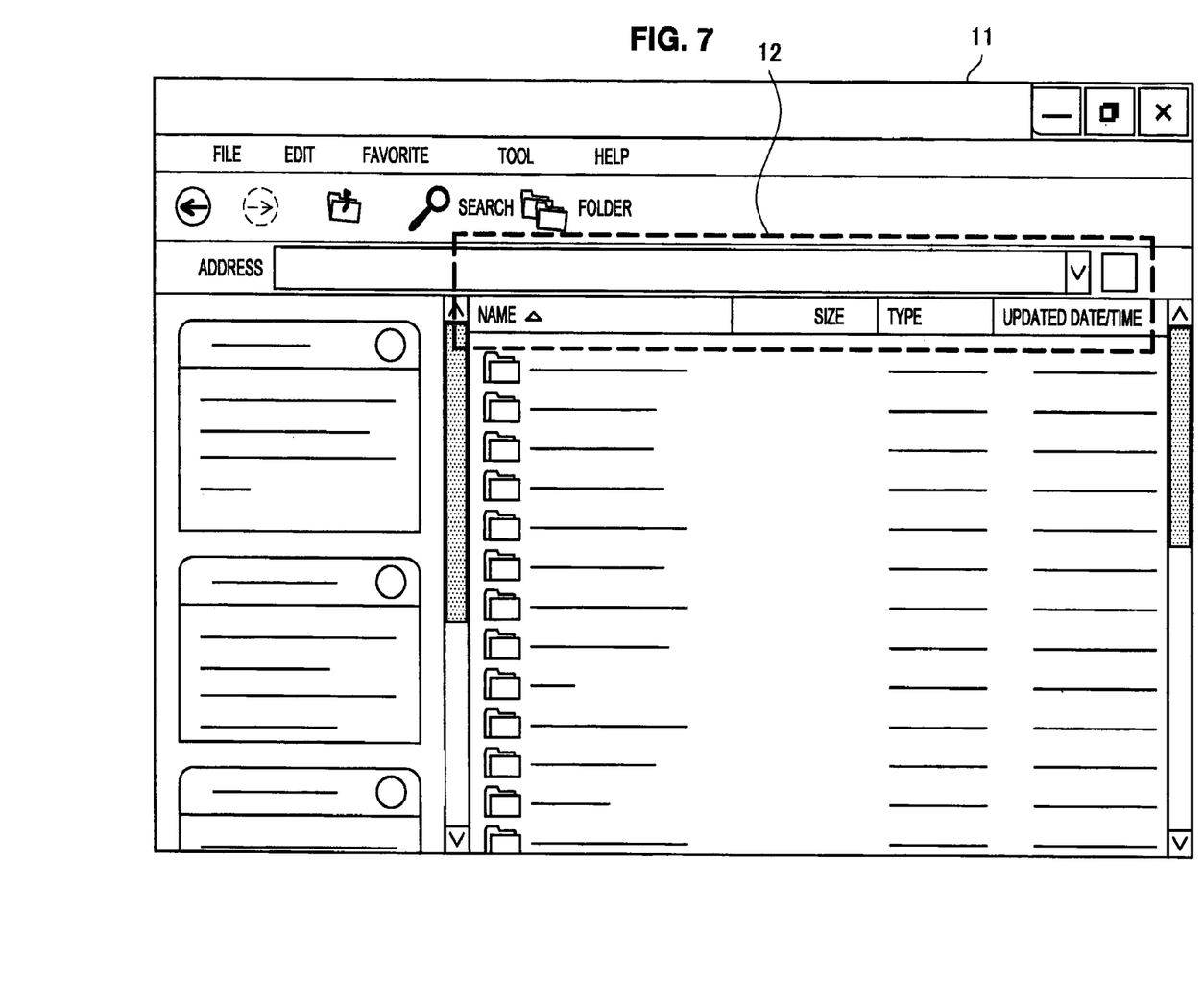
FIG. 7 is an explanatory diagram showing an example of a GUI of the past for changing a layout.

It is generally performed that various pieces of information are operated on an information terminal, the information ranging from document data, drawing data, and the like, to pieces of content such as an image, video, and music that are distributed from a server. With the enhancement of technology and the developments in communication environment, the kinds of data handled by a user have become diversified, and therefore, it is important to systematically manage data. In general, pieces of data are grouped by content type and managed. For example, the pieces of data are managed in a hierarchical structure of directories by an OS (Operating System) of a computer. The pieces of data classified into each directory is displayed in a form of a table within a window 11 using a GUI (Graphical User Interface), as shown in FIG. 7 for example, and hence, the user can intuitively operate the data.

In such a data group, the way of showing the data (layout) has a great influence on the operability when searching for desired data. As a GUI for changing the layout, there is exemplified the following GUI as shown in FIG. 7, in which each of the items such as the name, the size, the type, and the updated date of the pieces of data displayed in the title section 12 of the information displayed in the table is clicked by a pointer, and the pieces of data are sorted in terms of the selected item. A tab or the tike below a music list, which is displayed in a media player that reproduces music data and the like, is also an example of the GUI's for changing layout. Further, there is disclosed, in JP 2009-301579A, a technique of realizing a seamless user interlace by unifying a time-series direction, when displaying a representative image of a content file on a calendar having respective time-axial ranges of a year, months, and dates.

SUMMARY OF THE INVENTION

However, in the layout changing technique of the past described above, since the layout change was triggered by a GUI button or the like other than the data group, there was an issue that it was difficult to understand die relationship with the data. Further, since the layout of the data group is suddenly switched when the layout change is triggered, there is also an issue that it is difficult to remind a user of a relativity that die user is "looking at the same data group from another viewpoint".

In light of the foregoing, it is desirable to provide an information processing apparatus, an information processing method, and a program, which are novel and improved, and which are capable of naturally changing a layout by an interaction with the user.

According to an embodiment of the present invention, there is provided an information processing apparatus which includes a display section which displays, as a first layout state, an object group including a plurality of objects arranged in a first direction, a detection section which detects an operation input that is input to the display section, and a control section which, when the detection section detects an operation input in a second direction that is perpendicular to the first direction, changes the first layout state into a second layout state in which the respective objects constituting the object group which has been selected are spread and pieces of information associated with the plurality of objects, respectively, are displayed.

When the operation input in the second direction is detected by the detection section in the first layout stale, the control section may move the respective objects constituting the object group in the second direction in a manner that an arrangement of the selected object group is misaligned.

Further, the control section may determine a movement distance in the second direction of the respective objects constituting the object group based on information of variables which varies depending on a motion of the operation input.

When die operation input is stopped, the control section may return a display of the respective objects of the object group which have been moved in the second direction to the first layout state when the information of variables at a point of stopping the operation input is less than a predetermined threshold. On the other hand, the control section may allow the display of the respective objects of the object group to become die second layout state when the information of variables at a point of stopping die operation input is equal to or more than the predetermined threshold.

The information of variables can represent, for example, a movement distance or a movement speed of die operation input in the second direction.

Further, the control section may move the respective objects constituting the object group in the second direction in a manner that the arrangement of the selected object group is misaligned when a predetermined state change condition is satisfied, and the control section may cause the object group displayed in the first layout state to be scrolled in the second direction when the state change condition is not satisfied.

Here, the state change condition may be that the respective objects constituting the object group are moved in the second direction in a manner that the arrangement of the selected object group is misaligned, by inputting at least once an operation input in the first direction.

Alternatively, the state change condition may be that a motion of an operation input is not detected for a predetermined time period or longer in the first layout state.

The control section may cause the second layout state to be displayed regarding, as a reference point, an object among the plurality of objects, which is displayed at an initial contact position which was touched first when there was the operation input in the first layout state.

When an operation input in the first direction is detected by the detection section after a display is changed to the second layout stale, the control section may return a display of the display section from the second layout state to the first layout state.

Further, according to another embodiment of the present invention, there is provided an information processing method which includes the steps of detecting, by a detection section, an operation input that is input to a display section in which an object group including a plurality of objects arranged in a first direction is displayed as a first layout state, and changing, by a control section, when the detection section detects an operation input in a second direction that is perpendicular to the first direction, the first layout state into a second layout state in which die respective objects constituting the object group which has been selected are spread and pieces of information associated with die plurality of objects, respectively, are displayed.

In addition, according to another embodiment of the present invention, there is provided a program for causing a computer to function as an information processing apparatus which includes a detection control section which causes a detection section to detect an operation input that is input to a display section in which an object group including a plurality of objects arranged in a first direction is displayed as a first layout state, and a layout control section which, when the detection section detects an operation input in a second direction that is perpendicular to the first direction, changes die first layout state into a second layout state in which the respective objects constituting the object group which has been selected are spread and pieces of information associated with the plurality of objects, respectively, are displayed.

A computer program is stored in a storage device included in a computer, and causes the computer to junction as die information processing apparatus by being read and executed by a CPU included in the computer. Further, there is also provided a computer-readable recording medium in which the computer program is recorded. The recording medium is, for example, a magnetic disk or an optical disk.

According to the embodiments of die present invention described above, there can be provided the information processing apparatus, the information processing method, and the program, which are capable of naturally changing a layout by an interaction with a user.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in die following order.
1. First embodiment (case of arranging pieces of content that have semantically strong relation with each other in a tow)
2. Second embodiment (case of arranging pieces of content that have semantically strong relation with each other in a column)
3. Third embodiment (case of arranging, in a stacking manner, pieces of content that have semantically strong relation with each other in a depth direction)
4. Example of hardware configuration 1. First Embodiment

[Interaction when Selecting Content in Media Player]

First, with reference to FIG. 1, there will be described an interaction performed by an information processing apparatus according to a first embodiment of the present invention when selecting content in media player. Note that FIG. 1 is an explanatory diagram showing how an interaction goes on when selecting content in a media player which is provided by the information processing apparatus according to the present embodiment.

The information processing apparatus according to the present embodiment is an apparatus which is provided to a device having an input display section including a touch panel and a display section. The information processing apparatus provides an operation system into which the following are integrated: navigation indicating to a user that a layout can be changed within a data group; and a display layout change of the data group.

Let us assume that the information processing apparatus is applied to a media player which reproduces music, an image, video, and the like, for example. In a display section 114 of the media player, as shown in FIG. 1 (left diagram), there are displayed in lists, in rows (x-directions), thumbnail icons of pieces of content in different groups (A to E), respectively, such as music recently listened to and music recommended by a service. The group A includes thumbnail icons of pieces of content A1 to A4 and the like. Such a state in which the pieces of content in respective groups can be visually confirmed is referred to as "before layout change". A thumbnail icon is an example of an object displayed in the display section 114.

Figure 1:
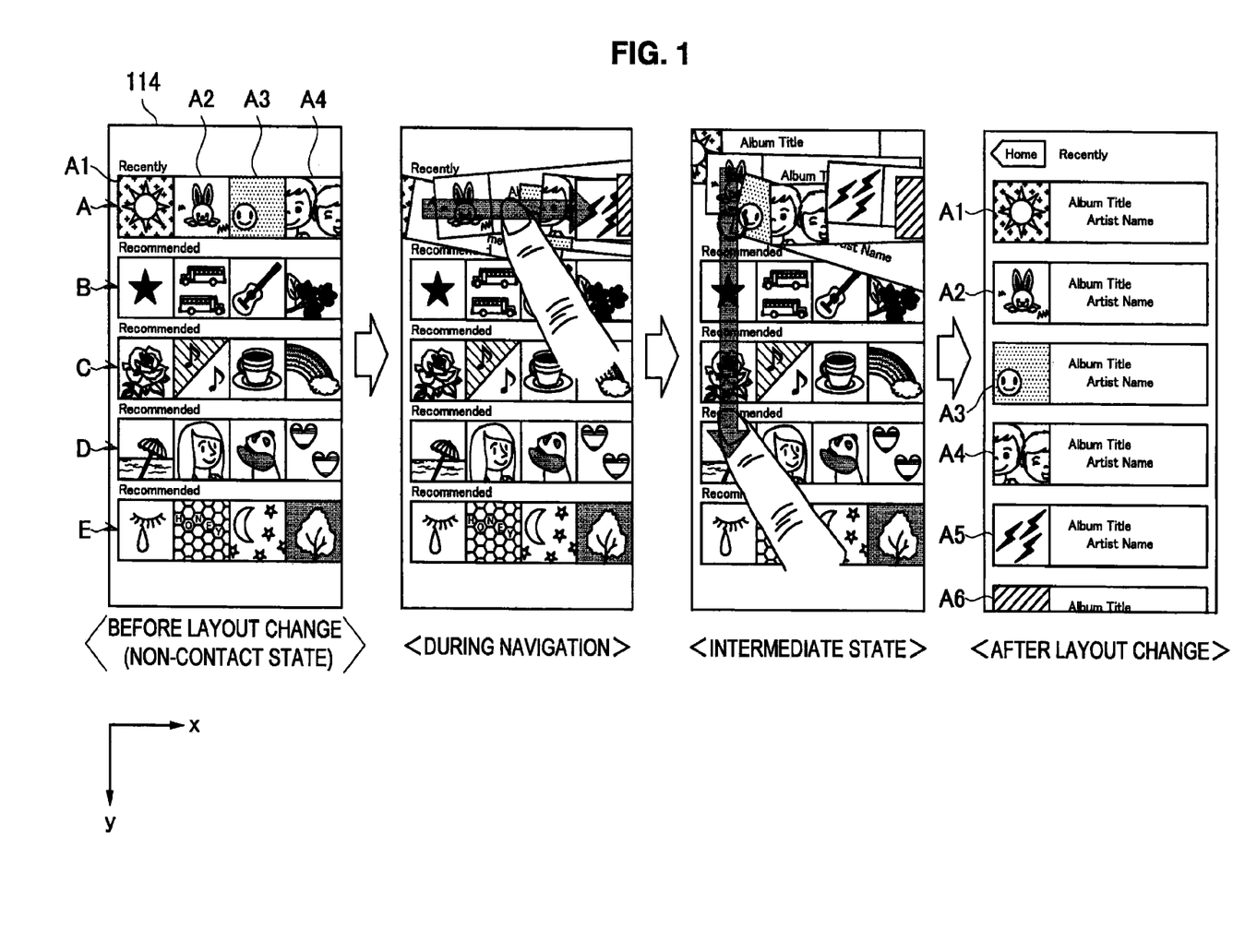
FIG. 1 is an explanatory diagram showing how an interaction provided by an information processing apparatus according to a first embodiment of the present invention goes on when selecting content in a media player.

When, in a state before layout change, dragging a finger in a horizontal direction (x-direction) while keeping the finger in contact with a touch panel, an icon group displayed at a contact position is scrolled in the horizontal direction as shown in FIG. 1 (second diagram from the left). In this case, in order to allow the user to recognize that die layout change can be triggered by dragging the finger in a vertical direction (y-direction), the information processing apparatus displays the icon group in a manner that individual icons in the icon group are misaligned in accordance with a minute movement distance of the finger in the vertical direction. In this way, a state indicating that the layout change can be triggered is referred to as "navigation state".

The user, who realizes that the layout change can be triggered when the icon group is misaligned, drags the finger in the vertical direction as shown in FIG. 1 (third diagram from die left), and can trigger die layout change of the icon group in the row displayed at the contact position of the finger. At that time, the information processing apparatus triggers an animation that the icons are further misaligned from those in the navigation state and the layout of the icons is changed in the vertical direction. The state is referred to as "intermediate state". In the intermediate state, the information processing apparatus realizes a reversible interaction by performing display processing for changing the layout or display processing for not changing the layout by a motion of the finger.

Then, when the layout change is completed, there is displayed a list of an icon group. For example, as shown in FIG. 1 (right diagram), pieces of content A1 to A6 of the group A are displayed in tandem, and more detailed information such as an album title and an artist name of each of the pieces of content A1 to A6 can be provided to the user.

In this way, in the layout change from the left diagram to the right diagram of FIG. 1, the navigation indicates to the user that the layout change can be triggered, and, by gradually changing the display, it is possible to naturally cause the user to recognize the interaction for changing the layout. Accordingly, it becomes unnecessary to cause the screen to display the GUI button or the like for triggering the layout switching, and it becomes easier to understand the relationship with the data. Further, the user naturally notices the interaction for changing the layout while operating a data group and performs the operation, and hence, it is possible to remind the user of the relativity that the user is "looking at the same data group from another viewpoint".

Hereinafter, detailed descriptions will be made on an information processing apparatus which functions for realizing the layout change, and layout change processing using the information processing apparatus.

[Functional Configuration of Information Processing Apparatus]

First, based on FIG. 2, a functional configuration of an information processing apparatus 100 according to the present embodiment will be described. Note that FIG. 2 is a block diagram showing the functional configuration of the information processing apparatus 100 according to the present embodiment.

Figure 2:
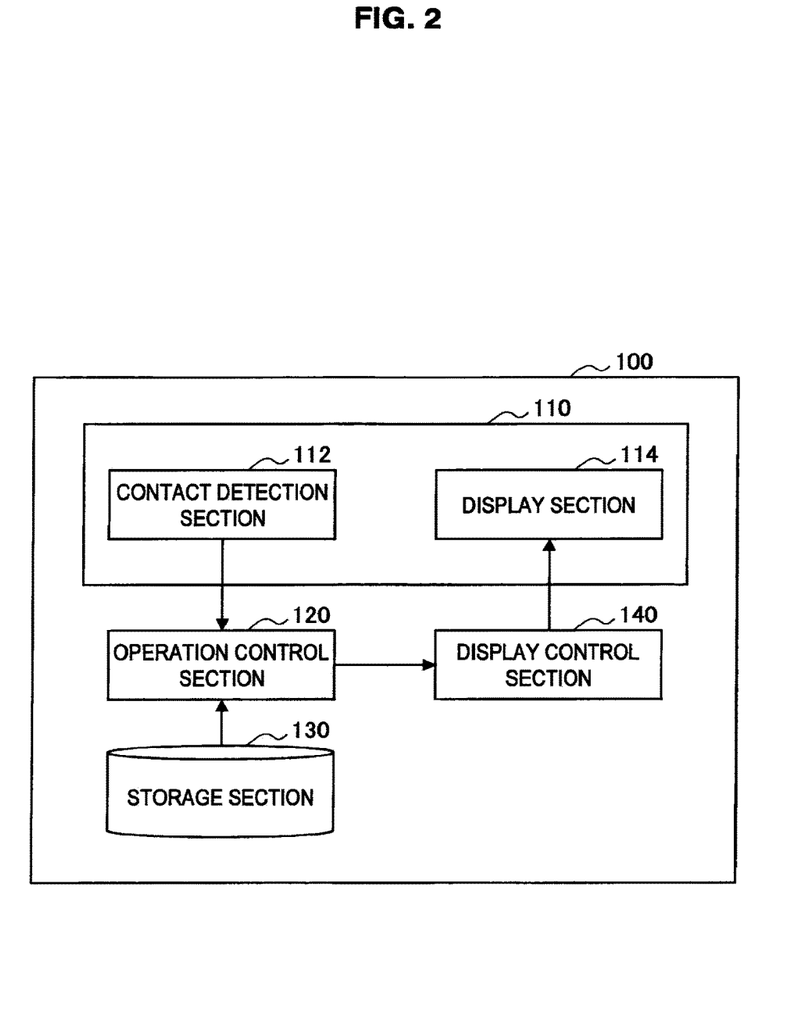
FIG. 2 is a block diagram showing a functional configuration of the information processing apparatus according to the embodiment.

The information processing apparatus 100 according to the present embodiment includes, as shown in FIG. 2, an input display section 110 having a contact detection section 112 and a display section 114, an operation control section 120, a storage section 130, and a display control section 140.

The input display section 110 is a functional section for displaying information and also inputting information. As for die contact detection section 112 of the input display section 110, there can be used an electrostatic touch panel, for example. The touch panel is provided in a stacking manner on a display surface of the display section 114. That is, although it is the surface of the touch panel that an operating object touches, such a state may be described hereinafter as that the operating object touches the display surface of the display section 114.

The contact detection section 112 detects a capacitance value which varies depending on whether or not the operating object such as a finger touches the display surface of the display section 114. Since the capacitance detected by the contact detection section 112 increases when the operating object touches the display surface, it can be determined that, when the capacitance value detected by the contact detection section 112 exceeds a predetermined value, die operating object touches the display surface. The contact detection section 112 outputs the detected capacitance value to the operation control section 120 as a detection result. Further, die display section 114 is an output device for displaying information, and displays information in accordance with the processing executed by the display control section 140.

The operation control section 120 specifies a motion of the operating object (that is, an operation input which is input by die operating object) based on the detection result of the contact detection section 112, and performs display processing corresponding thereto. The operation control section 120 determines execution of the navigation state, the intermediate state, and the layout change processing based on whether or not the operating object touches the display surface and a contact position at the tone of the contact, and notifies the display control section 140 of the determination.

The storage section 130 stores information, necessary for the navigation state, the intermediate state, and the layout change processing. As the information stored in the storage section 130, there can be exemplified a state change condition for the state to be shifted to the navigation state or the intermediate state (predetermined time at which a scrollable state shifts to the navigation state, a first threshold, a second threshold, etc.), and the like. Those pieces of information may be stored in the storage section 130 in advance, or may be set by the user and recorded in the storage section 130.

The display control section 140 performs processing of changing the display of the display section 114 based on an instruction from the operation control section 120. The display control section 140 changes display information based on the display state that is determined in accordance with the contact position and the motion of the operating object, which foe display control section 140 is notified of by the operation control section 120, and causes the display section 114 to display the changed display information. Such display control performed by the display control section 140 can be conducted by an existing technique.

[Layout Change Processing]

Figure 3:
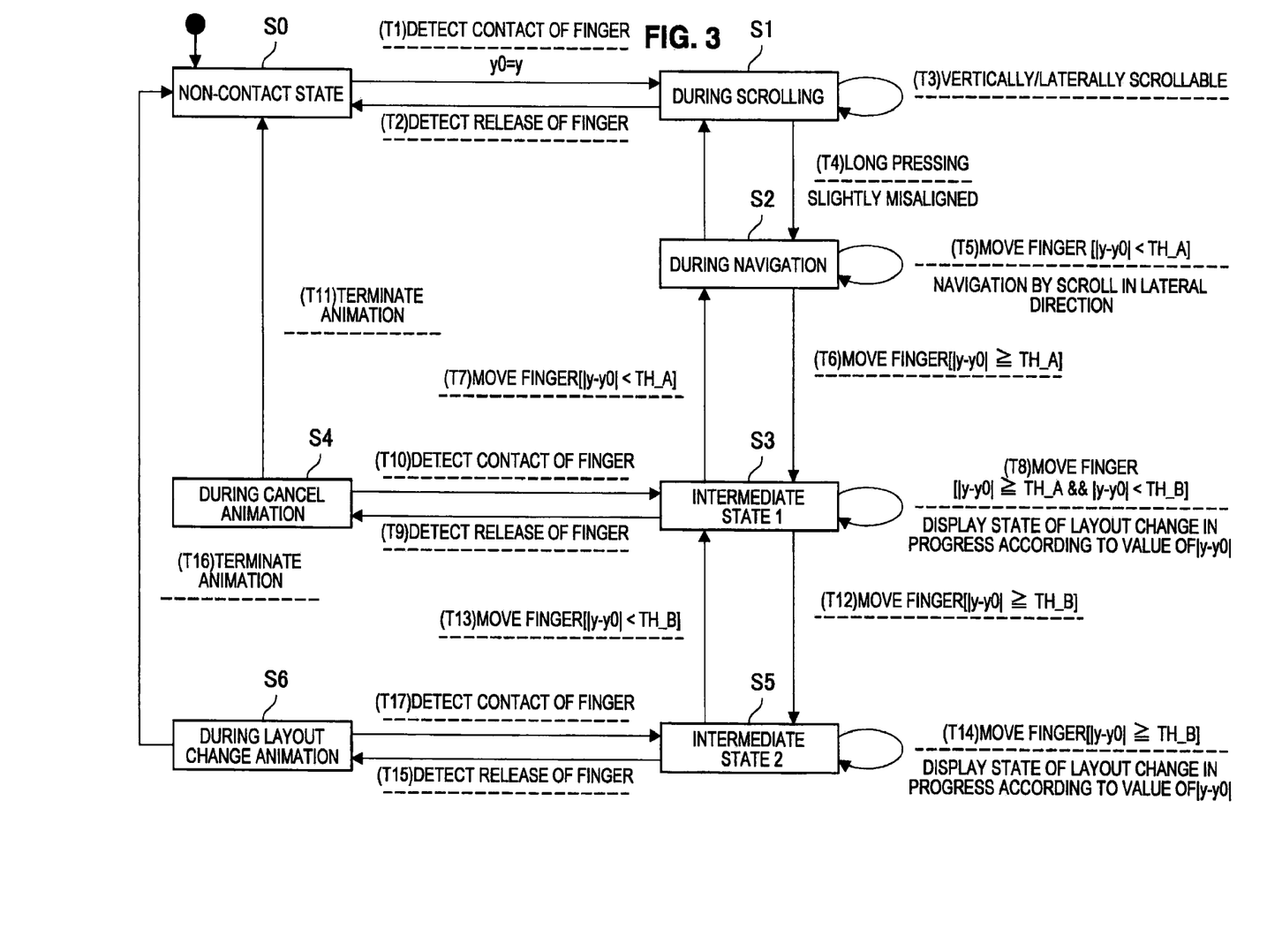
FIG. 3 is a state transition diagram showing layout change processing performed by the information processing apparatus according to the embodiment.

The layout change processing performed by the information processing apparatus 100 according to the present embodiment is executed by the state transition diagram shown in FIG. 3. Note that the state transition diagram of FIG. 3 corresponds to foe interaction shown in FIG. 1, and hereinafter, descriptions will be made assuming that the navigation is started by dragging an operating object in the lateral direction (x-direction) and that the layout change is triggered by dragging the operation object in the vertical direction (y-direction). A finger is used as the operating object here, and there may also be used a touch pen and the like. Further, in order to express state change conditions between respective states, the following variables and constants are defined as below.

y: Coordinate in y-direction when a finger is in contact with touch panel y0: Coordinate in y-direction at an instant at which finger is touched to touch panel (initial position)

TH_A: Threshold for discontinuing navigation (first threshold)

TH_B: Threshold for determining whether to cancel layout change or to complete layout change when finger is released from touch panel (second threshold)

Provided that the relationship of 0<TH_A<TH_B is satisfied.

A state where the finger is not in contact with the touch panel is referred to as "initial state" (S0). When the user causes his/her finger to touch the touch panel, the operation control section 120 stores the coordinate in y-direction at the instant al which finger is touched in a memory (not shown) as an initial position y0 based on the detection result of the contact detection section 112 (T1). Note that the initial position y0 is reset every time the finger is released from the touch panel. After that, the state becomes a scrollable state (S1). When it is detected by the detection result of the contact detection section 112 that the finger is released from the touch panel in the scrollable state (T2), the state returns to the initial state (S0).

In the scrollable state, a display content of the display section 114 can be scrolled in accordance with a movement direction of the finger (T3). When the finger is moved in the lateral direction, the icon group displayed at the contact position of foe finger is scrolled in foe lateral direction in accordance with a movement distance of the finger, and when the finger is moved in the vertical direction, an icon group is scrolled for each group in foe vertical direction in accordance with a movement distance of the finger.

When predetermined operation such as long pressing (keeping foe finger in contact with the same position for a predetermined time period or longer) in the scrollable state (T4), the operation control section 120 displays an arranged icon group in a manner that the icon group is slightly misaligned, and determines the transition to the navigation state (S2). The navigation state is a state where the movement distance of the finger from the initial position y0 in the vertical direction is smaller than the first threshold TH_A, that is, a state where |y−y0|<TH_A is satisfied. In the navigation state, die icon group is scrolled in the lateral direction in accordance with the movement distance of the finger in die lateral direction, and a navigation indicating that die layout can be changed is performed (T5).

For example, as shown in FIG. 1 (second diagram from the left), the operation control section 120 displays icons arranged in the lateral direction (x-direction), which are displayed at die position with which the finger is in contact in a manner that each of the icons is slightly moved in the vertical direction (y-direction). For example, the operation control section 120 can cause the icon to slightly move in proportion to the movement distance of the finger from the initial position y0 in the vertical direction, and can also cause a display angle to be calculated. In this way, by generating a motion in the vertical direction in the icon group, which has been arranged in the state where there has been no deviation in the vertical direction during scrolling, it allows the user to realize that the layout change can be triggered by dragging the finger in a vertical direction. Note that when the predetermined operation such as long pressing operation is performed in the navigation, the state may return to the scrollable state (S1).

When the movement distance of the finger from the initial position y0 in the vertical direction is equal to or larger than the first threshold TH_A in the navigation state, that is, in die case where |y−y0|≥TH_A is satisfied (T6), the state shifts to the intermediate state, in which processing up to the point at which the layout change is completed is performed. In the present embodiment, there are two states in the intermediate state in accordance with the movement distance of the finger from the initial position y0 in the vertical direction: an intermediate state 1 (S3) capable of shifting to the before-layout-change state; and an intermediate state 2 (S5) capable of shifting to the after-layout-change state. At the stage just after being shifted from the navigation state (S2), die state becomes the intermediate state 1 (S3) first.

The intermediate state 1 (S3) is a state where the movement distance of the 6 finger in the vertical direction is equal to or more than the first threshold TH_A and less than the second threshold TH_B, that is, a state where TH_A≤|y−y0|<TH_B is satisfied. In the intermediate state 1, the operation control section 120 displays a state of the layout change in progress (T8) by moving the icon group in accordance with the movement distance of the finger in the vertical direction. At that time, since the degree to which the icons are misaligned in the vertical direction becomes larger than that in the case of the navigation state, the user can recognize that the processing for the layout change is being performed. On die other hand, in the case where die movement distance of the finger in the vertical direction becomes less than the first threshold (T7), the state shifts from the intermediate state (S3) to the navigation state (S2).

Further, in the intermediate state 1 (S3), when the finger is released from the touch panel (T9), an animation display of the icon group which is displayed in a misaligned manner in accordance with the movement distance of the finger in the vertical direction is cancelled (S4). In this state, a cancel animation in which the misaligned icon group is gradually returned to the state before the layout change is displayed (T11), and finally, the state returns to the initial state (S0). On the other hand, in the case where the finger comes in contact again during displaying the cancel animation (T10), the operation control section 120 returns to the intermediate state 1 (S3), and again displays the icon group in a manner that the icon group moves in the vertical direction in accordance with the movement distance of the finger in the vertical direction.

When the movement distance of the finger in the vertical direction becomes equal to or more than the second threshold TH_B, that is, when |y−y0|≥TH_B is satisfied (T12), the operation control section 120 decides the state transition from the intermediate state 1 (S3) to the intermediate state 2 (S5). On the other hand, in the case where the movement distance of the finger in the vertical direction becomes less than the second threshold (T13), the state shifts from the intermediate state 2 (S5) to the intermediate state 1 (S3), to the intermediate state 2 (S5), the icon group is moved in the vertical direction in accordance with the movement distance of the finger in the vertical direction and displays a state of the layout change in progress (T14), in the same manner as die intermediate state 1 (S3). However, the processing performed in the intermediate state 2 (S5) when the finger is released from the touch panel differs from that in the case of the intermediate state 1 (S3). That is, when the finger is released from the touch panel (T15) in the intermediate state 2 (S5), the icon group moved along with the movement of the finger in the vertical direction is kept moving. In the vertical direction, and a layout change animation showing the completion of the layout change is displayed (S6).

In other words, in such layout change processing, it is possible to change the layout by further moving the finger to die vertical direction from the navigation state (S2) indicating that the layout can be changed. At that time, when the movement distance of the finger in the vertical direction is less than the second threshold, a cancel animation is displayed when die finger is released from the touch panel to order that the layout change can be easily cancelled. On the other hand when the movement distance of the finger in the vertical direction becomes equal to or more than the second threshold the operation control section 120 determines that the user performs die operation with intent to change the layout, performs the layout change even after the finger is released from the touch panel, and allows die state to become the layout state after the change. Owing to the reversibility of the interaction, the layout change can also be easily cancelled.

Then, when the layout change is completed as shown in die right diagram of FIG. 1, the animation display processing is terminated (T16), and the state change processing shown in FIG. 3 is terminated. In the case of returning to the display of before layout change after the layout change is completed the processing for returning to the state shown in the left diagram of FIG. 1 can be executed by pressing a "Home" button displayed in the right diagram of FIG. 1, for example. Alternatively, the processing for returning to the layout before the change may be associated with operation of dragging the finger in the lateral direction after the layout change, and, when foe drag operation in foe lateral direction is detected, foe processing fix causing the layout to return to the state shown in the left diagram of FIG. 1 may be executed. On the other hand, in foe case where foe finger comes in contact with the touch panel again during the layout change animation (T17), the operation control section 120 returns to the intermediate state 2 (S5), and again displays the icon group in a manner that the icon group moves in the vertical direction in accordance with the movement distance of foe finger in the vertical direction.

In the display after layout change, content displayed at the top (for example, content A1 in the left diagram of FIG. 1) in the display state before layout change may be displayed at the top in the same manner, for example. Alternatively, content displayed al the initial position y0 may be displayed at the top in the display state after layout change. In this way, the content that the user wants to display on foe display section 114 after the layout change can be reliably displayed on the display section 114.

In foe above, the layout change processing performed by the information processing apparatus 100 according to the present embodiment has been described. According to the present embodiment, it is possible to navigate the user by foe icon group that the layout of the icon group can be changed by foe operation that is easily distinguished by the user, such as horizontal dragging and vertical dragging, and to cause the user to perform foe layout change of foe icon group. In this case, when foe layout change is triggered, foe information processing apparatus 100 gradually causes the layout change to take place in accordance with continuous operation of the user, and allows the user to understand in what way the layout change takes place in a stage before foe operation is completed. In this way, the user can naturally recognize the interaction for changing the layout during the operation, and hence, the operability thereof can be enhanced.

Further, while the layout change is gradually carried out in accordance with the continuous operation of the user, the user can cancel the layout change from being triggered when the user ceases the operation by releasing the finger from the touch panel before die operation amount becomes equal to or more than a predetermined threshold, for example. On the other hand, in the case where the operation amount becomes equal to or more than the predetermined threshold, the layout change is triggered even when the user ceases the operation thereafter. In this way, by allowing the interaction to have reversibility, whether or not to execute the layout change can be easily determined during die operation.

By performing the layout change processing as in the present embodiment, it becomes unnecessary to place the GUI button or the like on the screen for switching the layout which has been used in the past, the display region can be effectively used, and an operation burden imposed on the user can also be reduced.

2. Second Embodiment

Figure 4:
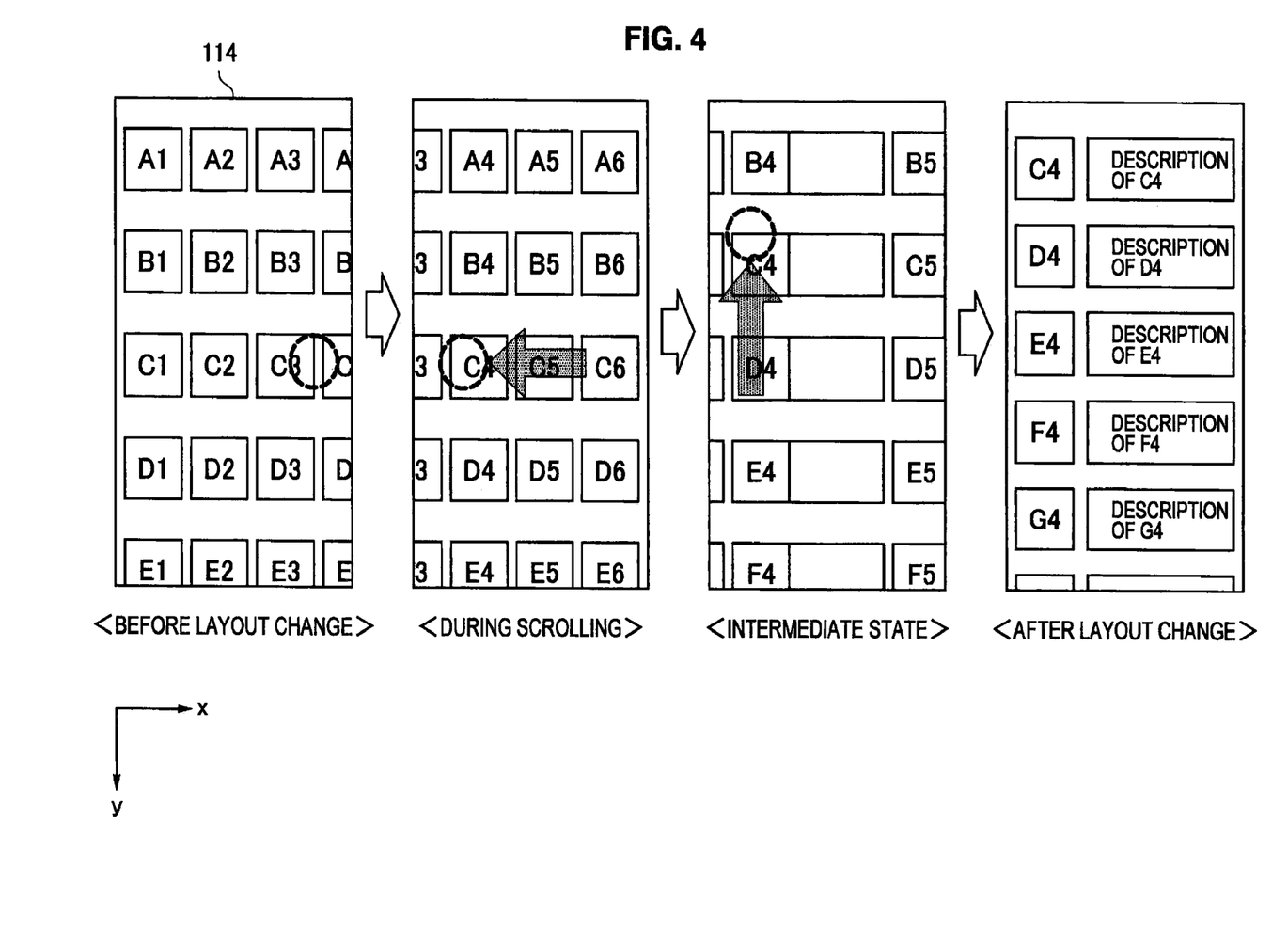
FIG. 4 is an explanatory diagram showing how an interaction goes on when selecting content according to a second embodiment of the present invention.

Next, based on FIG. 4, layout change processing according to a second embodiment of the present invention will be described. FIG. 4 is an explanatory diagram showing how an interaction goes on when selecting content according to the present embodiment. In an example of the present embodiment pieces of content that have semantically strong relation with each other are arranged in a column. Such a layout may be used for, for example, a photograph browser in which a photograph group taken on the same date is arranged in the vertical direction (y-direction), and the photograph groups are arranged in the lateral direction (x-direction) by dale. When applied to FIG. 4, in the left diagram, the pieces of content A1 to E1, A2 to E2, A3 to E3, and so on each represent a photograph group taken on the same date.

In this way, the layout change of the thumbnail icon group of the pieces of content, which are arranged by date, can be executed in the same manner as the layout change processing of the first embodiment shown in FIG. 3 performed by the information processing apparatus 100 having functions shown in FIG. 2. Hereinafter, descriptions will be made on the processing in the case of applying the layout change processing of the first embodiment to the layout shown in FIG. 4, and the description of the device configuration identical to the first embodiment and specific processing contents will be omitted.

First, the state shown in the left diagram of FIG. 4 represents a state before layout change. In this state, when the user places the finger on a thumbnail icon of content displayed on the display section 114, it is detected by the contact detection section 112 that the finger touches die display surface. Based on the detection result, die operation control section 120 determines a transition to a scroll state. Note diet die circle drawn in a dashed line shown in FIG. 4 represents a contact position of the finger. As shown in FIG. 4 (second diagram from the left), when the state becomes the scroll state, the entire icon groups displayed on the display section 114 are moved in the lateral direction (x-direction) and in the vertical direction (y-direction) based on the movement direction of the finger.

In the scroll state, when long pressing operation is performed for a predetermined time period or longer, for example, the operation control section 120 determines the transition to a navigation state which indicates that the layout of the icon group can be changed. In the navigation state, when the finger is moved in the vertical direction, which is perpendicular to the direction in which the icon group is arranged (lateral direction), a layout change is triggered which is for displaying only a detailed list of the icon group (for example, in the case of the photograph browser, a photograph group taken on a specific date) arranged in the vertical direction at the contact position of the finger, as shown in FIG. 4 (third diagram from the left). At that time, an icon group (also referred to as "another-icon group") other than the icon group of which the detailed list is displayed is moved to the left or right so as to disappear from the display region of the display section 114. Then, die operation control section 120 starts displaying descriptions related to respective pieces of content B4 to F4 of the icon group arranged in the vertical direction at the contact position of the finger on the display section 114.

At that time, the operation control section 120 moves the another-icon group to the left or right in accordance with the movement distance of the finger in the vertical direction. When the movement distance of the finger in the vertical direction is equal to or more than the first threshold, the state shifts from the navigation state to the intermediate state towards the layout change. Also in the intermediate state, the processing which is performed when the user stops the operation (for example, when the user releases the finger from the touch panel) differs in accordance with the movement distance of the finger in the vertical direction.

That is, in the case where the movement distance of the finger in die vertical direction is less than the second threshold (>first threshold), when the finger is released from the touch panel, the another-icon group which has been moved to the left or right is moved into the display region so that the another-icon group is displayed again. On the other hand, in the case where the movement distance of the finger in die vertical direction is equal to or more than the second threshold, when the finger is released from the touch panel, the another-icon group which has been moved to the left or right is moved in a manner to stay out of the display region, and the layout change is continued. At that time, as shown in the right diagram of FIG. 4, descriptions of the pieces of content associated with the icon groups C4 to G4, respectively, come to be displayed on the display region of the display section 114.

In this way, the information processing apparatus 100 is capable of changing the layout, even in the case of the layout shown in FIG. 4, in the same manner as in the first embodiment in accordance with the processing of FIG. 3. Also in the present embodiment, the user can gradually understand the meaning of the layout change during the interaction. Further, owing to the reversibility of the interaction, the layout change can also be easily cancelled. In addition, it becomes unnecessary to place the GUI button or the like on the screen for switching the layout which has been used in the past, and hence, the display region can be effectively used and an operation burden imposed on the user can also be reduced.

3. Third Embodiment

Figure 5:
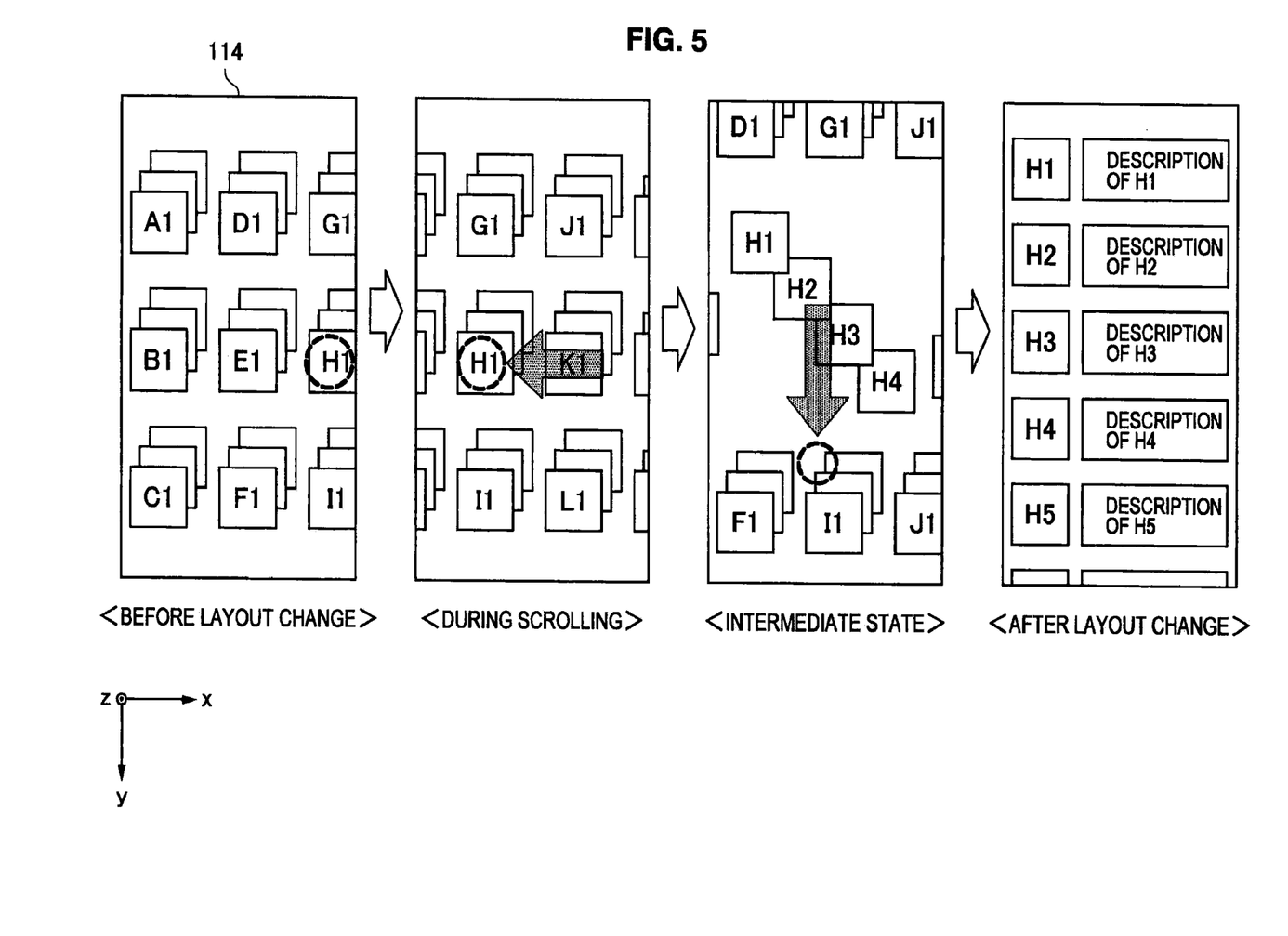
FIG. 5 is an explanatory diagram showing how an interaction goes on when selecting content according to a third embodiment of the present invention.

Next, based on FIG. 5, layout change processing according to a third embodiment of the present invention will be described. FIG. 5 is an explanatory diagram showing how an interaction goes on when selecting content according to the present embodiment. In an example of the present embodiment pieces of content that have semantically strong relation with each other are displayed in a stacking manner in the depth direction of a paper plane of FIG. 5. For example, there can be assumed the following usage: in a photograph browser, photographs are grouped by shooting date and die photographs are displayed in a stacking manner. When applied to FIG. 5, in the left diagram, the pieces of content A1, B1, C1, and so on each represent a photograph group taken on the same date.

In this way, the layout change of the thumbnail icon group of the pieces of content, which are arranged by date, can be executed in die same manner as the layout change processing of the first embodiment shown in FIG. 3 performed by the information processing apparatus 100 having functions shown in FIG. 2. Hereinafter, descriptions will be made on the processing in the case of applying the layout change processing of the first embodiment to the layout shown in FIG. 5, and the description of the device configuration identical to the first embodiment and specific processing contents will be omitted.

First, the state shown in the left diagram of FIG. 5 represents a state before layout change. In this state, when the user places finger on a thumbnail icon of content displayed on the display section 114. It is detected by the contact detection section 112 that die finger touches the display surface. Based on the detection result, the operation control section 120 determines a transition to a scroll state. Note that the circle drawn in a dashed line shown in FIG. 5 also represents a contact position of the finger. As shown in FIG. 5 (second diagram from the left), when the state becomes the scroll state, the entire icon groups displayed on the display section 114 are moved in the lateral direction (x-direction) and in the vertical direction (y-direction) based on the movement direction of die finger.

In the scroll state, when long pressing operation is performed for a predetermined time period or longer, for example, the operation control section 120 determines the transition to a navigation state which indicates that the layout of the icon group can be changed. In the navigation state, when the finger is moved in die vertical direction (y-direction), the icon group in a pile displayed at the contact position of the finger is displayed in a manner to slide. In the vertical direction in accordance with the movement distance of the finger, as shown in FIG. 5 (third diagram from the left). In this way, the information processing apparatus 100 indicates to the user that the layout can be changed. At that time, an icon group (also referred to as "another-icon group") other than the icon group displayed at the contact position of the finger is moved to the left or right so as to disappear from the display region of the display section 114. Then, the operation control section 120 starts displaying descriptions related to respective pieces of content (H1 to Hn; n represents an integer) of die icon group displayed at the contact position of the finger on the display section 114.

The operation control section 120 moves the another-icon group to the left or right in accordance with the movement distance of the finger in the vertical direction. When the movement distance of the finger in the vertical direction is equal to or more than the first threshold, the state shifts from the navigation state to the intermediate state towards the layout change. Also in the intermediate state, the processing which is performed when the user stops the operation (for example, when the user releases the finger from the touch panel) differs in accordance with the movement distance of the finger in the vertical direction.

That is, in the case where the movement distance of the finger in die vertical direction is less than the second threshold (>first threshold), when die finger is released from the touch panel, the another-icon group which has been moved to die 6 left or right is moved into the display region so that the another-icon group is displayed again. On die other hand, in the case where the movement distance of the finger in the vertical direction is equal to or more than the second threshold, when the finger is released from the touch panel, the another-icon group which has been moved to the left or right is moved in a manner to stay out of the display region, and the layout change is continued. When the layout change is completed, as shown in the right diagram of FIG. 5, descriptions of the pieces of content associated with the icon groups H1 to H5, respectively, come to be displayed cm the display region of the display section 114.

In this way, the information processing apparatus 100 is capable of changing the layout, even in the case of the layout shown in FIG. 5, in the same manner as in die first embodiment in accordance with die processing of FIG. 3. Also in the present embodiment, the user can gradually understand the meaning of the layout change during the interaction. Further, owing to the reversibility of the interaction, the layout change can also be easily cancelled. In addition, it becomes unnecessary to place the GUI button or the like on the screen for switching die layout which has been used in the past, and hence, the display region can be effectively used and an operation burden imposed on the user can also be reduced.

4. Example of Hardware Configurations

Figure 6:
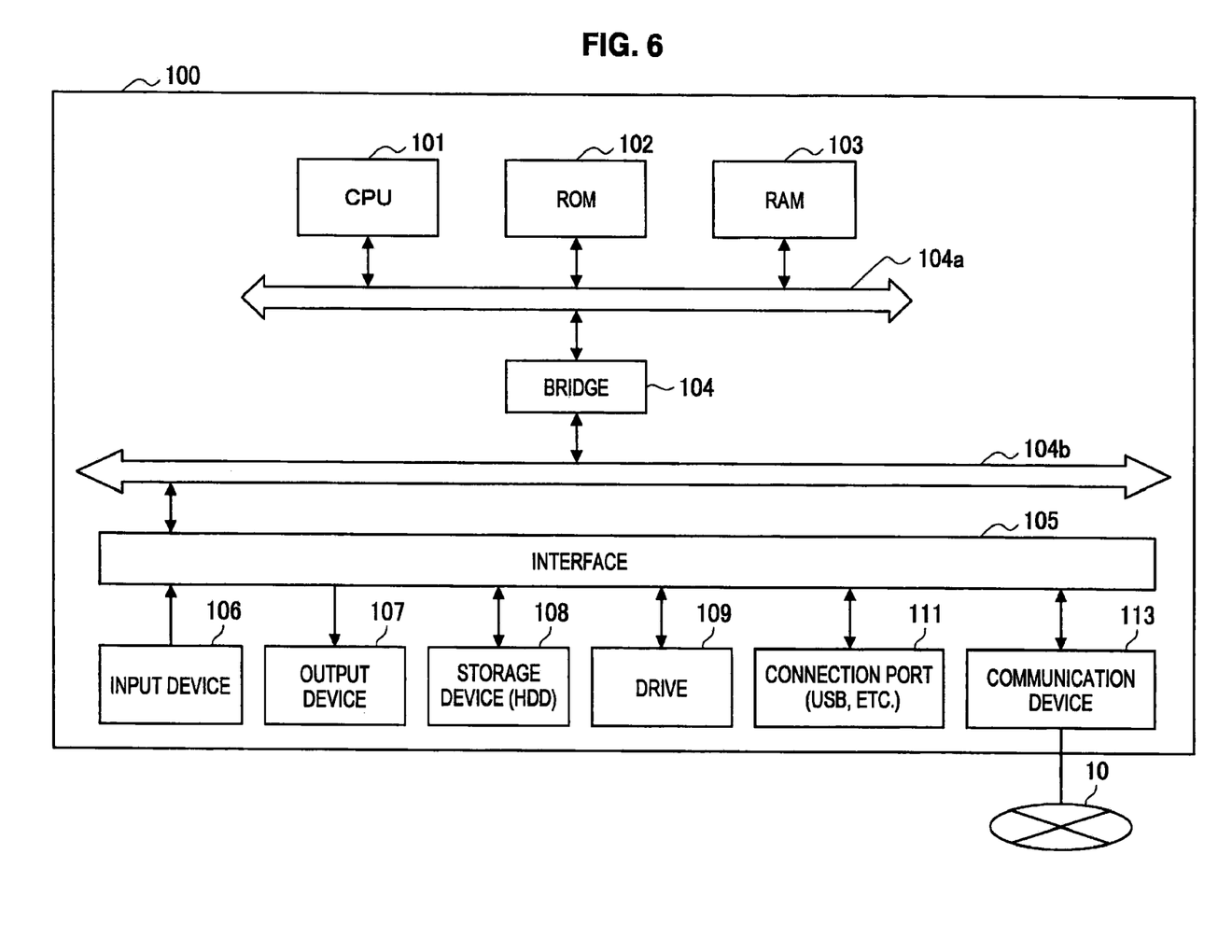
FIG. 6 is a block diagram showing an example of a hardware configuration of an information processing apparatus.

A part of processing performed by the information processing apparatus 100 according to the present embodiment may be executed by hardware or may be executed by software, in this case, the information processing apparatus 100 may be configured as a computer shown in FIG. 6. Hereinafter, based on FIG. 6, an example of a hardware configuration of the information processing apparatus 100 according to the present embodiment will be described.

The information processing apparatus 100 according to the present embodiment can be realized by, as described above, a processing device such as a computer. As shown in FIG. 6, the information processing apparatus 100 includes a CPU (Central Processing Unit) 101, a ROM (Read Only Memory) 102, a RAM (Random Access Memory) 103, and a host bus 104a. Further, the information processing apparatus 100 includes a bridge 104, an external bus 104b, an interface 105, an input device 106, an output device 107, a storage device (HDD) 108, a drive 109, a connection port 111, and a communication device 113.

The CPU 101 functions as an arithmetic processing unit and a control unit, and controls entire operation of the information processing apparatus 100 in accordance with various programs. Further, die CPU 101 may be a microprocessor. The ROM 102 stones a program, a calculation parameter, and die tike used by the CPU 101. The RAM 103 temporarily stores a program used in execution of the CPU 101, a parameter varying as appropriate during the execution, and die like. They are connected with each other via die host bus 104a configured from a CPU bus or the like.

The host bus 104a is connected to the external bus 104b such as a PCI (Peripheral Component Interconnect/Interface) bus via the bridge 104. Note that it is not necessary that the host bus 104a, the bridge 104, and die external bus 104b be configured separately, and the functions thereof may be implemented in one bus.

The input device 106 is configured from, for example, input means for inputting information by a user, such as a mouse, a keyboard, a touch panel, a button, a microphone, a switch, and a lever, and an input control circuit which generates an input signal based on the input by the user and outputs the generated input signal to the CPU 101. The output device 107 includes, for example, display devices such as a liquid crystal display (LCD) device, an OLED (Organic Light Emitting Diode) device, and a lamp, and an audio output device such as a speaker.

The storage device 108 is an example of a storage section of the information processing apparatus 100, and is a device for storing data. The storage device 108 may include a storage medium, a recording device for recording data in the storage medium, a reading device for reading out the data from the storage medium, and a deletion device for deleting the data recorded in the storage medium. The storage device 108 is configured from an HDD (Hard Disk Drive), for example. The storage device 108 drives a hard disk and stores a program and various data executed by the CPU 101.

The drive 109 is a reader/writer for the storage medium and is bulk hi or externally attached to die information processing apparatus 100. The drive 109 reads out information recorded in a removable recording medium which is mounted thereto, such as a magnetic disk, an optical disk, a magneto-optical disk, or a semiconductor memory, and outputs the information to the RAM 103.

The connection port 111 is an interface connected to an external device, and is a connection port with an external device capable of transmitting data by a USB (Universal Serial Bus), for example. Further, the communication device 113 is a communication interface which is configured from, for example, a communication device for establishing a connection with a communication network 10. In addition, the communication device 113 may be a wireless LAN (Local Area Network) enabled communication device, a wireless USB enabled communication device, or a wired communication device for performing wired communication.

It should be understood by diose skilled in the art that various modifications, combinations, sub-combinations and alterations may occur depending on design requirements and other factors insofar as they are within the scope of die appended claims or the equivalents thereof.

For example, in the embodiments described above, the state in the layout change is determined based on the movement distance of the operating object, but the present invention is not limited thereto. For example, the state may be determined depending on movement speed of the operating object.

Further, in the embodiments described above, the state change condition from the scrollable state to the navigation state (T4 in FIG. 3) is to perform the long pressing operation, but the present invention is not limited thereto. For example, the state change condition may be that there has already been a case, at least once, where the icons included in the icon group are displayed in a manner to be slightly misaligned by moving the finger in the lateral direction. When the state change condition is satisfied, the operation control section 120 causes the icons to be spread in the vertical direction when the finger is moved in the vertical direction. On the other hand, in the case where the state change condition is not satisfied, the display is caused to be scrolled in the vertical direction.

What is claimed is:

1. An information processing apparatus comprising:
 a touch panel;
 a display;
 at least one processor; and
 a computer-readable medium encoded with instructions which, when executed by the at least one processor, cause the information processing apparatus to:
  detect, with the touch panel, a first operation movement and a second operation movement;
  control to display, with the display, a first layout which includes a plurality of display objects, an intermediate display for indicating a layout shift from the first layout to a second layout as an animation, and the second layout;
  scroll the plurality of display objects, in response to the first operation movement, in a state of the first layout and the second layout; and
  shift, by the intermediate display, from the first layout to the second layout dynamically in response to the second operation movement, wherein a state of the intermediate display comprises a first intermediate state capable of shifting to the first layout and a second intermediate state capable of shifting to the second layout, wherein a change between the first intermediate state and the second intermediate state is based on a position change of an operation object of the second operation movement, wherein the state of the intermediate display is the first intermediate state when movement distance of the second operation movement is less than a first threshold, and the state of the intermediate display is the second intermediate state when the movement distance of the second operation movement is greater than the first threshold, wherein, when the operation object of the second operation movement is released from the touch panel in the first intermediate state, the plurality of display objects moved by the second operation movement goes back to the first layout automatically, wherein, when the operation object of the second operation movement is released from the touch panel in the second intermediate state, the plurality of display objects moved in accordance with the second operation movement is kept moving to the second layout automatically, wherein an x-direction is a lateral direction of the touch panel, a y-direction is a vertical direction of the touch panel, and a z-direction is orthogonal to the x-direction, the y-direction, and a contact surface of the touch panel, and wherein the computer-readable medium further causes the information processing apparatus to switch between the display objects not overlapping with each other in the z-direction in the first layout and the second layout and the display objects overlapping with each other in the z-direction in the intermediate display.

2. The information processing apparatus according to claim 1, wherein the position change includes a movement speed of the second operation movement.

3. The information processing apparatus according to claim 1, wherein the position change includes a movement distance of the second operation movement.

4. The information processing apparatus according to claim 3, wherein the movement distance of the second operation movement is a distance between an initial position of the operation object when the operation object contacts the touch panel and a position of the operation object when the operation object is released from the touch panel.

5. The information processing apparatus according to claim 3, wherein when movement distance of the second operation movement when the operation object is released from the touch panel is greater than a first threshold and less than a second threshold, the state of the intermediate display is the first intermediate state.

6. The information processing apparatus according to claim 5, wherein the second threshold is greater than the first threshold.

7. The information processing apparatus according to claim 5, wherein when movement distance of the second operation movement when the operation object is released from the touch panel is greater than the second threshold, the state of the intermediate display is the second intermediate state.

8. The information processing apparatus according to claim 1, wherein a number of objects being displayed in the first layout is larger than a number of objects being displayed in the second layout.

9. The information processing apparatus according to claim 1, wherein information which is related to the plurality of display objects and is not included in the first layout, is displayed in the second layout.

10. The information processing apparatus according to claim 1, wherein the computer-readable medium further causes the information processing apparatus to
determine whether the state of the intermediate display is the first intermediate state or the second intermediate state in response to information of variables that varies depending on the second operation movement.

11. The information processing apparatus according to claim 10, wherein, when the information of the variables is less than a predetermined threshold, the computer-readable medium further causes the information processing apparatus to
determine the state of the intermediate display to be the first intermediate state.

12. The information processing apparatus according to claim 10, wherein, when the information of the variables is more than a predetermined threshold, the computer-readable medium further causes the information processing apparatus to
determine the state of the intermediate display to be the second intermediate state.

13. The information processing apparatus according to claim 10, wherein the information of the variables includes a movement speed of the second operation movement.

14. The information processing apparatus according to claim 10, wherein the information of the variables includes a movement distance of the second operation movement.

15. The information processing apparatus according to claim 1, wherein the plurality of display objects comprise photographs.

16. The information processing apparatus according to claim 15, wherein the photographs are arranged based on date information.

17. The information processing apparatus according to claim 1, wherein the plurality of display objects comprise thumbnail icons.

18. The information processing apparatus according to claim 1, wherein a top-leftmost display object of the display objects in the first layout is same as a top-leftmost display object of the display objects in the second layout.

19. The information processing apparatus according to claim 1, wherein the display objects are not superimposed in the first layout and the display objects are not superimposed in the second layout.

20. An information processing method comprising:
detecting, with a touch panel, a first operation movement and a second operation movement;
controlling to display, with a display, a first layout which includes a plurality of display objects, an intermediate display for indicating a layout shift from the first layout to a second layout as an animation, and the second layout;
scrolling the plurality of display objects, in response to the first operation movement, in a state of the first layout and the second layout;
shifting, by the intermediate display, from the first layout to the second layout dynamically in response to the second operation movement, wherein a state of the intermediate display comprises a first intermediate state capable of shifting to the first layout and a second intermediate state capable of shifting to the second layout, wherein a change between the first intermediate state and the second intermediate state is based on a position change of an operation object of the second operation movement, wherein the state of the intermediate display is the first intermediate state when movement distance of the second operation movement is less than a first threshold, and the state of the intermediate display is the second intermediate state when the movement distance of the second operation movement is greater than the first threshold, wherein, when the operation object of the second operation movement is released from the touch panel in the first intermediate state, the plurality of display objects moved by the second operation movement goes back to the first layout automatically, wherein, when the operation object of the second operation movement is released from the touch panel in the second intermediate state, the plurality of display objects moved in accordance with the second operation movement is kept moving to the second layout automatically, and wherein an x-direction is a lateral direction of the touch panel, a y-direction is a vertical direction of the touch panel, and a z-direction is orthogonal to the x-direction, the y-direction, and a contact surface of the touch panel;and switching between the display objects not overlapping with each other in the z-direction in the first layout and the second layout and the display objects overlapping with each other in the z-direction in the intermediate display.

21. A non-transitory computer-readable medium having embodied thereon a program, which when executed by a computer causes the computer to execute a method, the method comprising:

detecting, with a touch panel, a first operation movement and a second operation movement;

controlling to display, with a display, a first layout which includes a plurality of display objects, an intermediate display for indicating a layout shift from the first layout to a second layout as an animation, and the second layout;

scrolling the plurality of display objects, in response to the first operation movement, in a state of the first layout and the second layout;

shifting, by the intermediate display, from the first layout to the second layout dynamically in response to the second operation movement, wherein a state of the intermediate display comprises a first intermediate state capable of shifting to the first layout and a second intermediate state capable of shifting to the second layout, wherein a change between the first intermediate state and the second intermediate state is based on a position change of an operation object of the second operation movement, wherein the state of the intermediate display is the first intermediate state when movement distance of the second operation movement is less than a first threshold, and the state of the intermediate display is the second intermediate state when the movement distance of the second operation movement is greater than the first threshold, wherein, when the operation object of the second operation movement is released from the touch panel in the first intermediate state, the plurality of display objects moved by the second operation movement goes back to the first layout automatically, wherein, when the operation object of the second operation movement is released from the touch panel in the second intermediate state, the plurality of display objects moved in accordance with the second operation movement is kept moving to the second layout automatically, and wherein an x-direction is a lateral direction of the touch panel, a y-direction is a vertical direction of the touch panel, and a z-direction is orthogonal to the x-direction, the y-direction, and a contact surface of the touch panel; and switching between the display objects not overlapping with each other in the z-direction in the first layout and the second layout and the display objects overlapping with each other in the z-direction in the intermediate display.

* * * * *